United States Patent
Hayter et al.

(10) Patent No.: US 9,200,618 B2
(45) Date of Patent: Dec. 1, 2015

(54) RETENTION SYSTEMS

(75) Inventors: Christopher Hayter, West Linn, OR (US); Russell Mounce, Troutdale, OR (US)

(73) Assignee: American Metal Specialties, Inc., Milwaukie, OR (US)

( * ) Notice: Subject to any disclaimer, the term of this patent is extended or adjusted under 35 U.S.C. 154(b) by 873 days.

(21) Appl. No.: 13/251,997

(22) Filed: Oct. 3, 2011

(65) Prior Publication Data
US 2013/0084184 A1   Apr. 4, 2013

(51) Int. Cl.
*F03D 11/00* (2006.01)
*F03D 7/02* (2006.01)
*H01M 2/10* (2006.01)

(52) U.S. Cl.
CPC .............. *F03D 11/00* (2013.01); *F03D 7/0224* (2013.01); *H01M 2/1077* (2013.01); *Y02E 10/722* (2013.01); *Y02E 10/723* (2013.01)

(58) Field of Classification Search
CPC ..... F03D 7/0224; F03D 7/0256; F03D 7/042; F03D 11/00; F05B 2240/90
USPC ............ 206/703, 722, 725; 361/695; 416/26, 416/27, 30; 415/19, 213.1, 214.1
See application file for complete search history.

(56) References Cited

U.S. PATENT DOCUMENTS

| | | | |
|---|---|---|---|
| 2008/0158813 A1* | 7/2008 | Yin | 361/695 |
| 2009/0269652 A1* | 10/2009 | Hafemeister | 429/35 |

* cited by examiner

*Primary Examiner* — Dwayne J White
*Assistant Examiner* — Adam W Brown
(74) *Attorney, Agent, or Firm* — Marger Johnson

(57) ABSTRACT

Retention systems are disclosed. In some embodiments, a retainer apparatus is configured to retain a battery of the type used to power a pitch-control drivetrain for adjusting a pitch angle of a wind-turbine rotor. In a working embodiment, the retainer apparatus has a separable housing member and sleeve member configured to matingly engage each other in an interlocking relationship and to define a retention chamber having an open interior region sized to receive the battery. Adjustable pitch rotors having one or more innovative retainer apparatus are also disclosed. Innovative principles disclosed herein can be adapted to retainers for a wide variety of retainable elements, other than batteries.

7 Claims, 16 Drawing Sheets

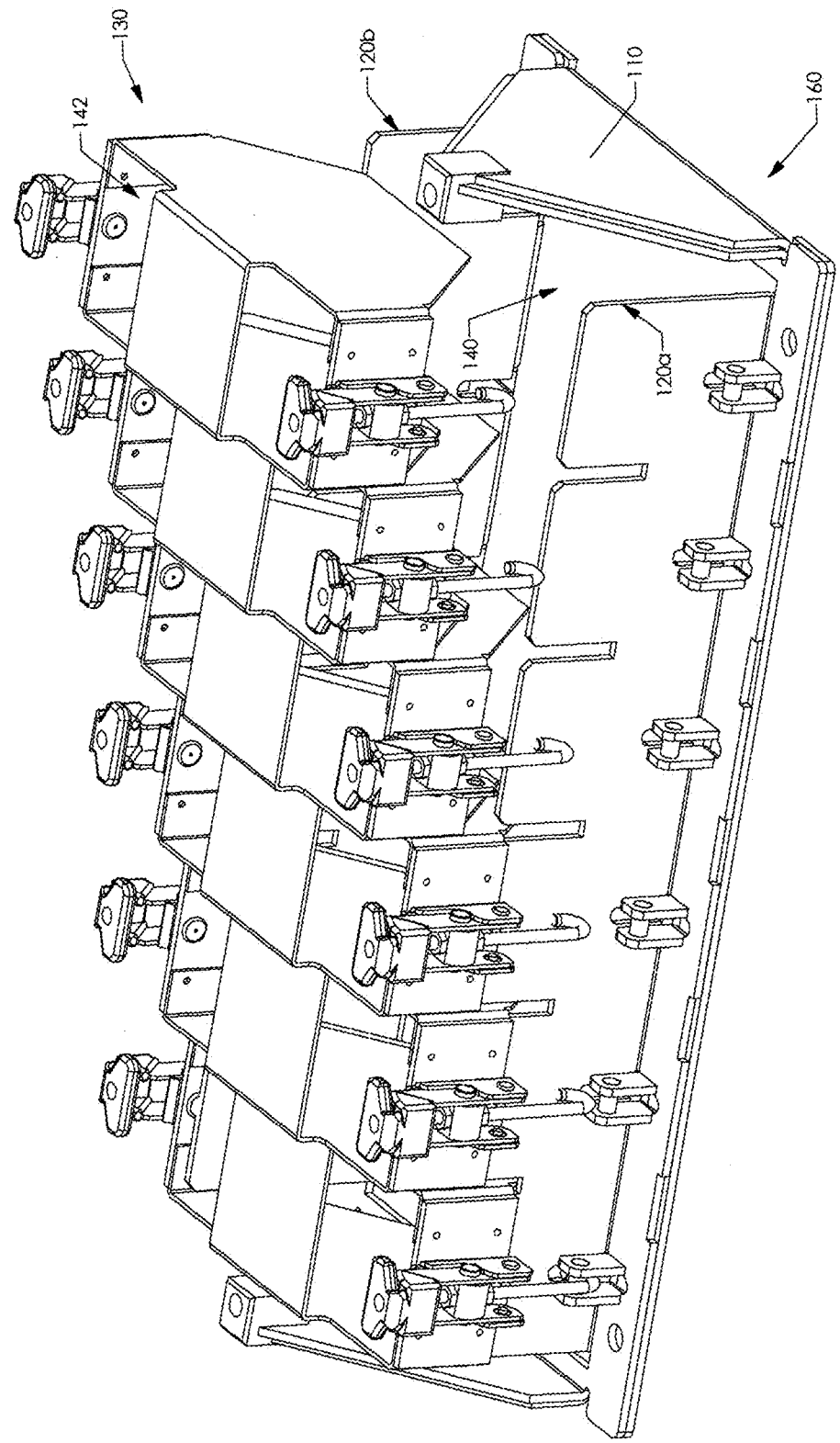

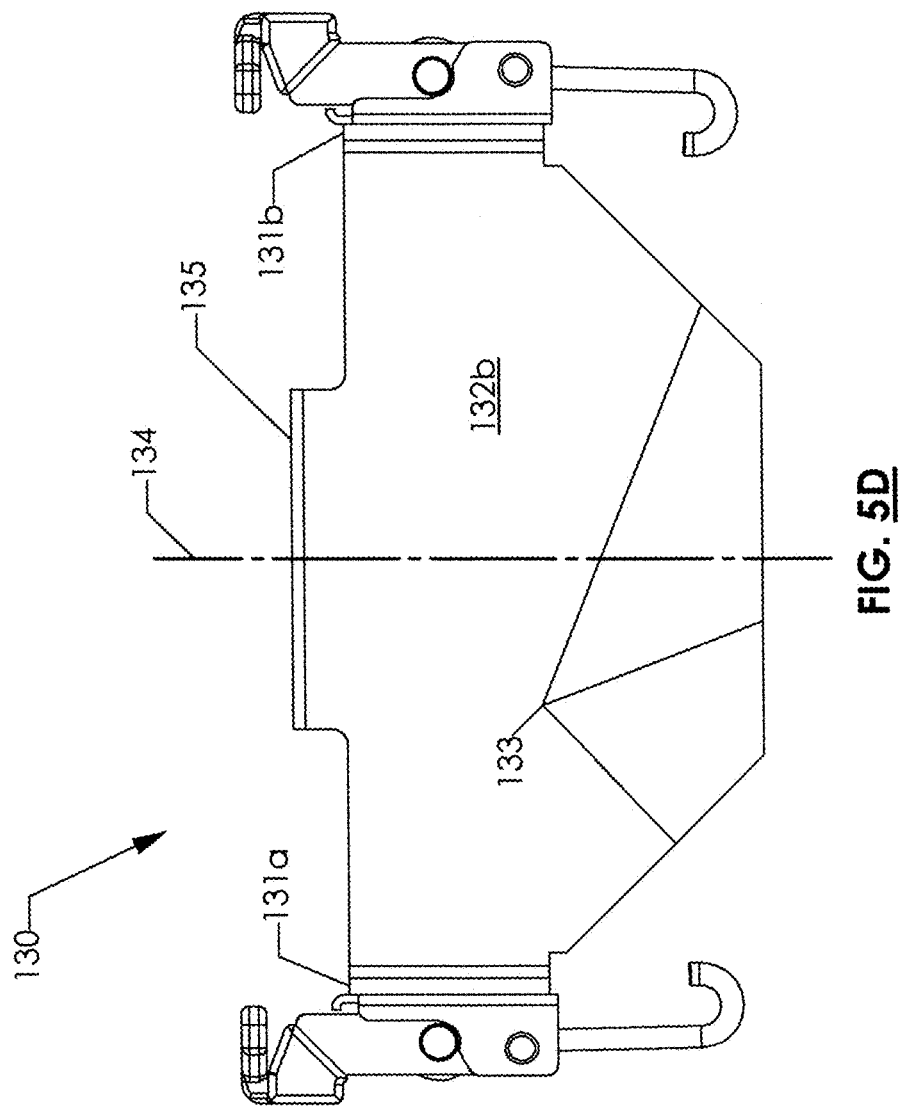

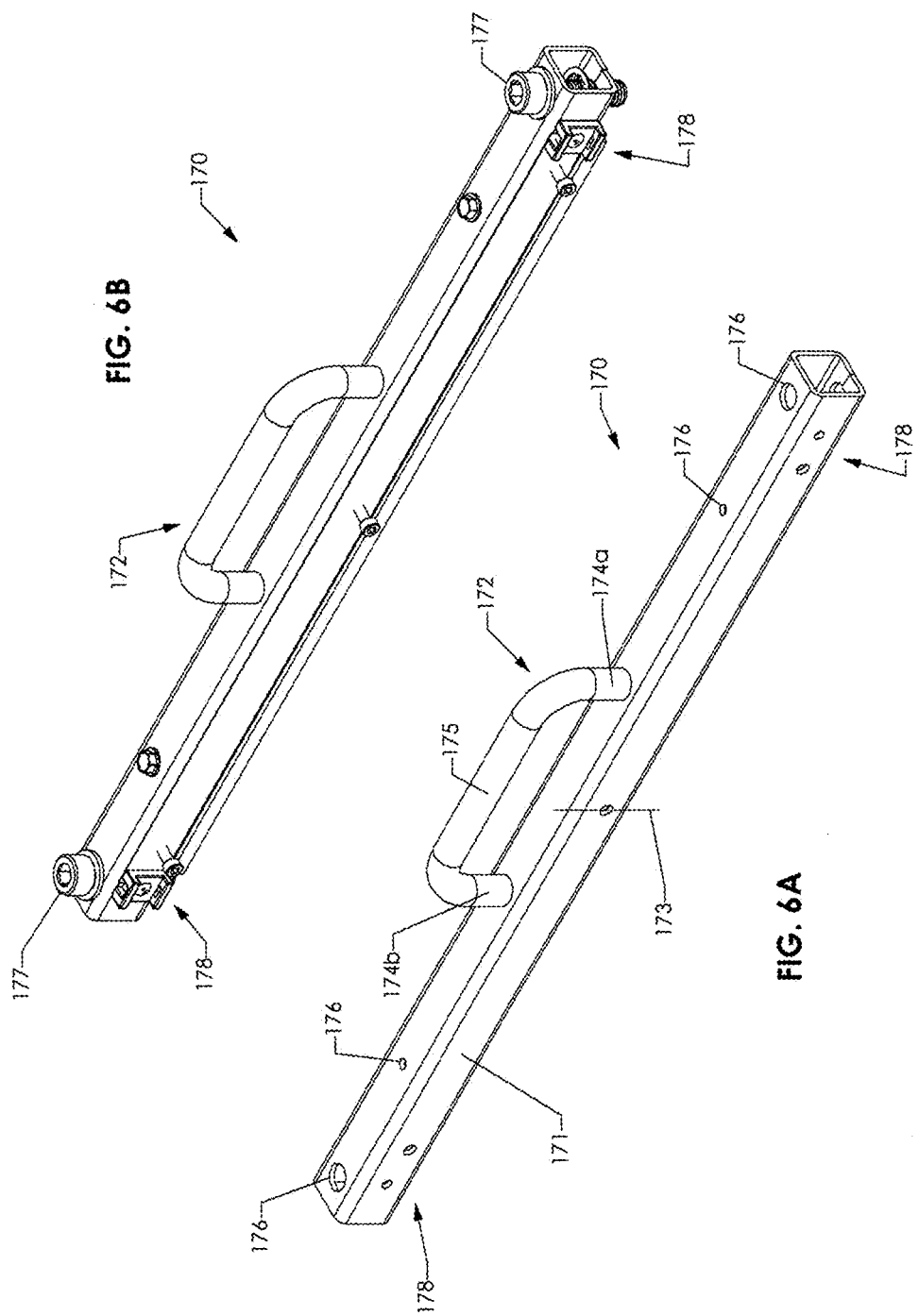

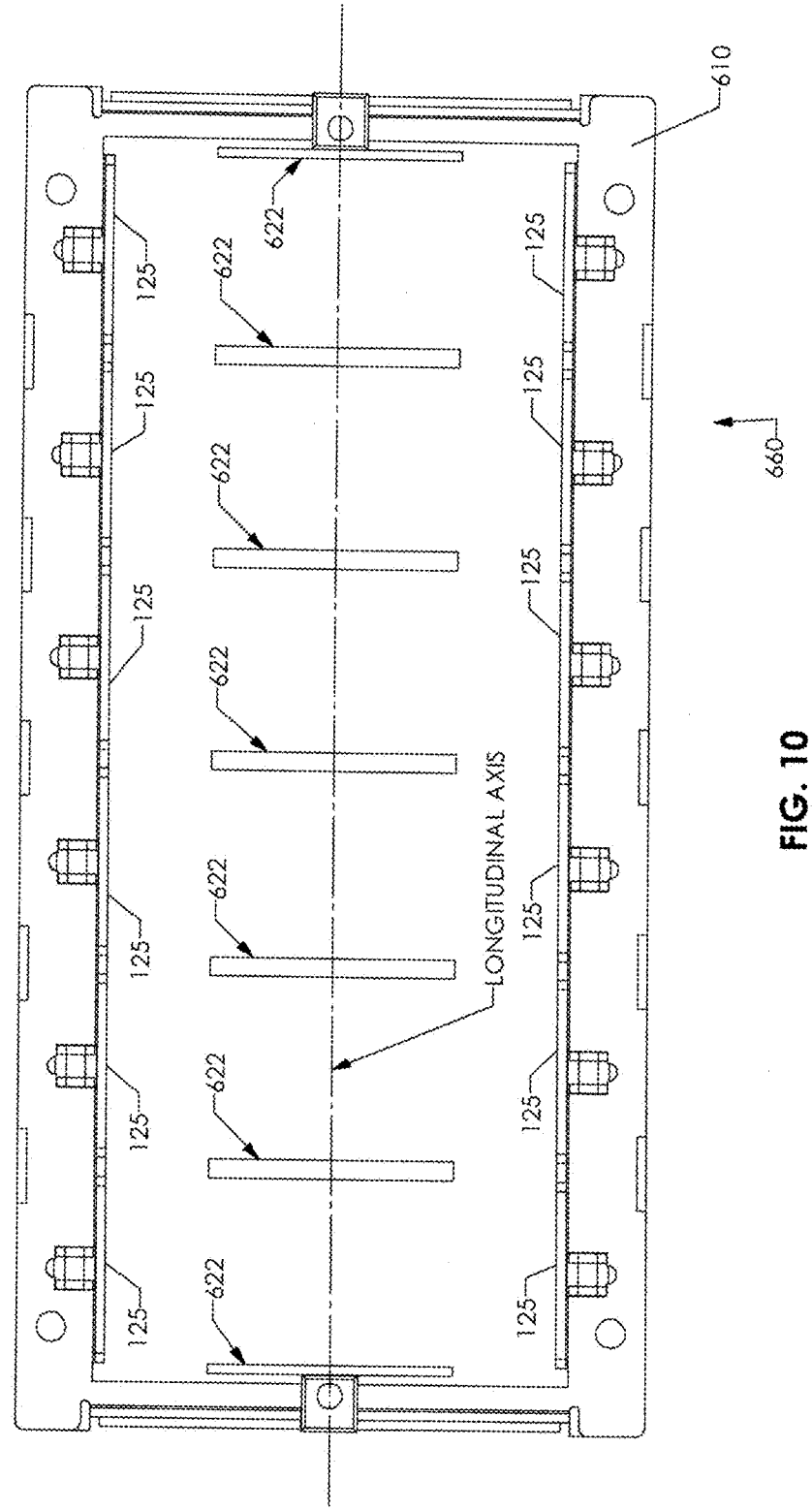

RETENTION SYSTEMS

BACKGROUND

The innovations disclosed herein pertain to retention systems, and more particularly, but not exclusively, to retention systems for electrical batteries, such as, for example, retention systems configured to support a plurality of batteries operatively coupleable with each other. Some disclosed retention systems are configured to reliably support a plurality of batteries in a rotating reference frame, such as, for example, in a rotor of an wind turbine configured to generate electricity.

According to some estimates, the installed base of wind-turbine based electricity generation in the United States has grown from about 2,500 megawatts (MW) at the end of the year 2000 to about 40,200 MW at the end of 2010. During that time frame, a typical wind-turbine efficiency for converting kinetic energy of moving air (or wind) to electrical power has improved, at least in part by the proliferation of wind turbines incorporating adjustable-pitch rotor blades.

FIG. 1A and FIG. 1B illustrate a common horizontal-axis wind turbine 10 mounted atop a tower 20 in an elevated position (e.g., between about 50 meters and about 100 meters above ground level 30, for example, between about 65 meters and about 80 meters). The illustrated wind-turbine 10 has a rotor 15 configured to rotate about a generally horizontal axis of rotation 16. A drivetrain transmits power from the rotor 15 to an electrical generator positioned within a nacelle 17. The rotor 15 has a plurality of blades 18 extending radially outward from a hub shown in more detail in FIG. 1C.

Although a wind turbine 10 can generate electricity while the rotor 15 rotates, if the wind changes direction or stops blowing, the blades 18 may insufficiently urge the rotor in rotation, causing the power generation capability of the wind turbine 10 to drop precipitously. Accordingly, some wind-turbine assemblies of the general type just described (e.g., having a rotor and a drivetrain) are capable of rotating about a vertically oriented axis 21 (e.g., an axis extending longitudinally of the tower 20), enabling the rotor 15 to be positioned facing the wind.

As well, some wind turbines allow the pitch angle of a rotor blade 18 to be set using an electrical motor and drivetrain configured to rotate the blade about a blade axis of rotation, as indicated in FIG. 1C. A pitch angle of each rotor blade 18 relative to a wind direction or vector) can be selected to correspond to, for example, a desired mechanical load on one or more of the blades 18, rotor 15, drivetrain and tower 20. By selecting a desired pitch angle, the rotor's ability to capture energy from the wind can be tuned while simultaneously protecting the turbine 10 and tower 20 from damage that otherwise could occur from high winds.

Some models of wind turbines provide one or more batteries for powering an electrical motor configured to drive a pitch-rotation drivetrain corresponding to a given rotor blade 18. For example, each rotor blade 18 can be configured to receive a respective battery (or array of battery elements electrically coupled with each other) for powering the respective rotor's pitch-rotation drivetrain. Such a battery (or array of battery elements) is sometimes referred to as a "pitch-control battery."

A conventional pitch-control battery has an array of, for example, six individual battery elements being so electrically coupleable with each other (e.g., in series or in parallel) as to be capable of providing desired electrical characteristics suitable for powering an electrical motor and pitch-rotation drivetrain. In conventional retention systems, each of the individual battery elements in the array of battery elements is epoxied or otherwise permanently affixed to a generally planar base rendering the entire array of battery elements inoperable if even one of the battery elements becomes inoperable.

The base, in turn, is configured to be suitably mounted in a rotor blade 18. As the rotor 15 rotates, the base and corresponding array of battery elements of the pitch-control battery orbit the generally horizontal axis of rotation 16, in some instances placing the base and other components under substantial stresses arising from, for example, centripetal acceleration.

SUMMARY

Although typically rechargeable, pitch-control batteries and their constituent battery elements enjoy a finite useful life. Unfortunately, conventional pitch-control batteries are costly to replace in terms of labor and materials. For example, when even a single battery element of a conventional pitch-control battery is no longer useful, the entire corresponding array of battery elements must be replaced, despite that one or more other battery elements may still be operable. Disposing of otherwise useful battery elements is wasteful, and replacing a conventional pitch-control battery array, which can weigh in excess of 80 pounds, requires a technician to carry the replacement battery array from the ground to the elevated installation position.

Innovative retention systems disclosed herein overcome one or more of the foregoing or other problems. For example, some innovative retention systems described herein are capable of reliably retaining an array of battery elements of a pitch-control battery, while allowing for the replacement of individual battery elements independently of other battery elements in an array of battery elements. Thus, systems disclosed herein can save on material costs and reduce waste by avoiding disposal of otherwise operable battery elements. Also, disclosed systems can reduce labor costs by eliminating the need for a technician to lug a new, approximately 80-pound battery 100 meters skyward because a single battery element in a pitch-control battery failed.

As well, some innovative retention systems are capable of reliably retaining an array of battery elements in a pitch-control battery as the battery orbits about a central axis of rotation, even when exposed to a variety of harsh environments, including, for example, rotating reference frames, random mechanical vibrations and environments that range from high temperatures to low temperatures.

These and other previously unattainable advantages are made possible, at least in part, by retention systems and other apparatus disclosed herein.

According to one innovative aspect, a retention apparatus can be configured to retain a plurality of elements. The apparatus can have a housing member and a sleeve member. The housing member and the sleeve member can be movable relative to each other from an open configuration to a closed configuration. In some instances, the housing member and the sleeve member can be configured to matingly engage each other in an interlocking engagement. The housing member and the sleeve member are configured to define a retention chamber having an open interior region sized to insertably receive one or more of the plurality of elements. Each retention chamber has a corresponding open configuration and a corresponding closed configuration. The respective one or more elements is receivable in the open interior region of the retention chamber when the retention chamber is positioned in the open configuration, and the respective one or more elements can be removably retained within the open interior region when the retention chamber is positioned in the closed configuration.

The base can define at least one of the walls defining the open interior region of the retention chamber.

Innovative retention apparatus can have a first wall and a second wall facing each other in an opposed relationship. The first wall and the second wall can be configured to generally extend perpendicularly from the base and to define a respective first wall and a respective second wall of the retention chamber. The housing member can define the first wall and the second wall, and wherein each of the first wall and the second wall is fixedly attached to the base.

The sleeve member can be a first sleeve member and the retention apparatus can further have a second sleeve member. Each sleeve member can correspond to a respective retention chamber and can be configured to matingly engage the first wall and the second wall, and to at least partially receive one or more of the plurality of elements. Each sleeve member can define at least one of the plurality of walls defining each respective retention chamber.

Each of the first wall and the second wall can define a plurality of juxtaposed notches. Each of the first wall and the second wall can define respective pluralities of juxtaposed portions. Each of the sleeve members is configured to slidingly mate with a respective portion of the first wall between adjacent notches in the first wall and a respective portion of the second wall between adjacent notches in the second wall. Each sleeve member can have first and second opposed end walls and first and second opposed sidewalls extending between the first and second opposed end walls. A top wall can be oriented generally transversely relative to the first and second end walls and the first and second side walls and extend between the first and second side walls. Each of the juxtaposed notches in the first wall can correspond to a respective notch in the second wall. When the sleeve member matingly engages the first wall and the second wall, the first sidewall of the sleeve can be slidingly received in corresponding notches in the first wall and the second wall, and the second sidewall of the sleeve can be slidingly received in corresponding notches in the first wall and the second wall. The respective portion of the first wall between the adjacent notches in the first wall can be positioned internally of the first end wall of the sleeve relative to the retention chamber. The respective portion of the second wall between the adjacent notches in the second wall can be positioned internally of the second end wall of the sleeve relative to the retention chamber. The top wall can be positioned in opposed relationship relative to the base. Respective notches in the first wall and in the second wall can be sized such that, simultaneously, a first sleeve can matingly engage with a first portion of the first wall and a first portion of the second wall and a second sleeve can matingly engage a second portion of the first wall and a second portion of the second wall.

A fastener can be configured to releasably retain the housing member and the sleeve member in the closed configuration when the fastener is in a fastener-closed position. The fastener can be configured to allow the housing member and the sleeve member to move from the closed configuration to the open configuration when the fastener is positioned in a fastener-open position. In some instances, the fastener has a cam-over type of clasp.

The sleeve member can define a respective one or more of the retention chambers. The sleeve member can be hingedly affixed to the base, so the base defines a floor of the corresponding one or more of the retention chambers. The sleeve member can be configured to swing from a closed position overlying the base to an open position. A user can access the retention chamber when the sleeve member is positioned in the open position.

A fastener can be configured to releasably retain the sleeve member in the closed position when the fastener is in a fastener-closed position and to allow the housing to swing to the open position when the fastener is in a fastener-open position. As noted above, the fastener can have a cam-over type of clasp.

According to a second innovative aspect, adjustable-pitch rotors are disclosed. Such rotors have an airfoil and a structural member positioned within the airfoil. A retention chamber can be positioned adjacent to the structural member. The retention chamber can be configured to releasably retain one or more of a plurality of battery elements. The plurality of battery elements can be configured, for example, to form a pitch-control battery. A technician can replace one or more of the plurality of battery elements independently of one or more other of the plurality of battery elements.

The retention chamber can be at least partially defined by a base mounted to the structural member, opposed first and second walls extending from the base and a sleeve configured to matingly engage the opposed first and second walls. The adjustable pitch rotor can also have a fastener configured to releasably retain the sleeve in a mating engagement with one or both of the opposed first and second walls.

The retention chamber can be at least partially defined by a base mounted to the structural member and a housing configured to be at least partially releasably affixed to the base. The housing can be configured to receive one or more of the plurality of battery elements. The housing can be hingedly coupled with the base such that the housing is configured to swing from a closed, retention position overlying the base to an open position. When the housing is positioned in the open position, one or more of the respective plurality of battery elements can be accessed.

According to a third innovative aspect, battery retainers are disclosed. A generally planar base can define a centerline axis extending longitudinally of the base. The base can have a fastener-engagement feature.

A first generally planar wall can extend generally perpendicularly from the base and be oriented generally parallel to the centerline axis. The first generally planar wall can define a first plurality of juxtaposed notches.

A second generally planar wall can extend generally perpendicularly from the base and be oriented generally parallel to the centerline axis. The second generally planar wall can define a second plurality of juxtaposed notches/

The first generally planar wall can be spaced from the centerline axis in a first direction and the second generally planar wall can be spaced from the centerline axis in a second direction generally opposite the first direction. The second plurality of notches can correspond to the first plurality of notches such that each notch in the second plurality of notches is positioned opposite a corresponding one of the notches in the first plurality of notches.

A sleeve can have opposed end walls and opposed side walls extending between the opposed end walls, as well as a top wall extending between the opposed side walls and being oriented generally perpendicularly relative to the opposed side walls and the opposed end walls. The end walls, side walls and top wall can at least partially define an open interior region. At least one of the opposed side walls can have a tapered longitudinal dimension defining a spade-like periphery.

A spacing between the opposed side walls can at least partially correspond to a spacing between two of the juxtaposed notches. A spacing between the opposed end walls can at least partially correspond to a spacing between the first generally planar wall and the second generally planar wall. The sleeve can be configured to matingly engage the first generally planar wall and the second generally planar wall with the opposed side walls slidingly received in respective notches. The opposed end walls can be positioned outwardly of the first generally planar wall and the second generally planar wall relative to the open interior region.

A fastener can have a clasp member mounted to a corresponding one of the end walls and a hasp member configured to engage the fastener-engagement member. The clasp member can be configured to urge the hasp member toward a first position when the clasp member is in a closed position and to urge the hasp member toward a second position spaced from the first position when the clasp member is in an open position. When the hasp member engages the fastener engagement member and the clasp member is in the closed position, the hasp member can be placed in tension and thereby urge the sleeve toward the base.

The sleeve can be a first sleeve. The retainer can further have a second sleeve having opposed end walls and opposed side walls extending between the opposed end walls and a top wall extending between the opposed side walls and being oriented generally perpendicularly relative to the opposed side walls and the opposed end walls. The end walls, side walls and top wall of the second sleeve can at least partially define an open interior region.

A spacing between the opposed side walls of the second sleeve can at least partially corresponds to a spacing between two of the juxtaposed notches. A spacing between the opposed end walls of the second sleeve can at least partially correspond to a spacing between the first generally planar wall and the second generally planar wall such that the second sleeve is configured to matingly engage the first generally planar wall and the second generally planar wall. At least one of the notches in the first generally planar wall and the corresponding notch in the second generally planar wall can be sized to be able to simultaneously, slidingly receive one of the opposed side walls of the first sleeve and one of the opposed side walls of the second sleeve.

The foregoing and other features and advantages will become more apparent from the following detailed description, which proceeds with reference to the accompanying drawings.

BRIEF DESCRIPTION OF THE DRAWINGS

The accompanying drawings show aspects of the innovative systems disclosed herein, unless specifically identified as showing a known feature from the prior art.

FIG. 3 shows an exploded isometric view of a portion of the retainer shown in FIG. 2.

FIG. 5D shows a side-elevation view of the sleeve member shown in FIG. 5A.

FIGS. 6A and 6B respectively show an isometric view of a handle member of the apparatus shown in FIG. 2.

FIG. 10 shows a top plan view of an alternative embodiment of a housing member of the type shown in FIG. 4A.

DETAILED DESCRIPTION

Various principles related to retention systems are described herein by way of reference to exemplary systems, some of which relate to retaining electrical batteries. Nonetheless, one or more of the disclosed principles can be adapted to various system embodiments to achieve one or more desired system characteristics. Systems relating to retaining batteries are merely examples of innovative systems and are described herein to illustrate aspects of the various disclosed principles. Accordingly, some embodiments of disclosed innovations may be equally applicable for use in applications other than retaining batteries, and other embodiments of the disclosed innovations will become apparent after considering the innovative principles described herein.

Overview

Various configurations of retention systems are described. In a general sense, disclosed retention systems have at least one retention chamber configured to releasably retain one or more of a plurality of elements. Some disclosed retention systems have a plurality of retention chambers, with each retention chamber corresponding to one or more respective retainable elements. In some specific examples, such a retainable element comprises an electric battery, or a battery element in an array of operatively coupled battery elements.

Although referred to as "battery elements" in the description of specific examples of retention systems, other retention systems incorporating one or more disclosed principles can retain myriad other types of "elements," with "container elements", e.g., drums, boxes, bottles, barrels, cannisters, tanks and cans, being but one example of such another retainable element. Other examples of retainable elements include, for example, tools, integrated electronics and a wide variety of industrial and commercial products. Accordingly, it is to be understood that the term "battery element" merely refers to one example of a retainable "element," and that this disclosure is not intended to be limited to retention systems for "battery elements" alone, but rather is intended to encompass retention systems of all sorts of retainable elements.

Figure 2:
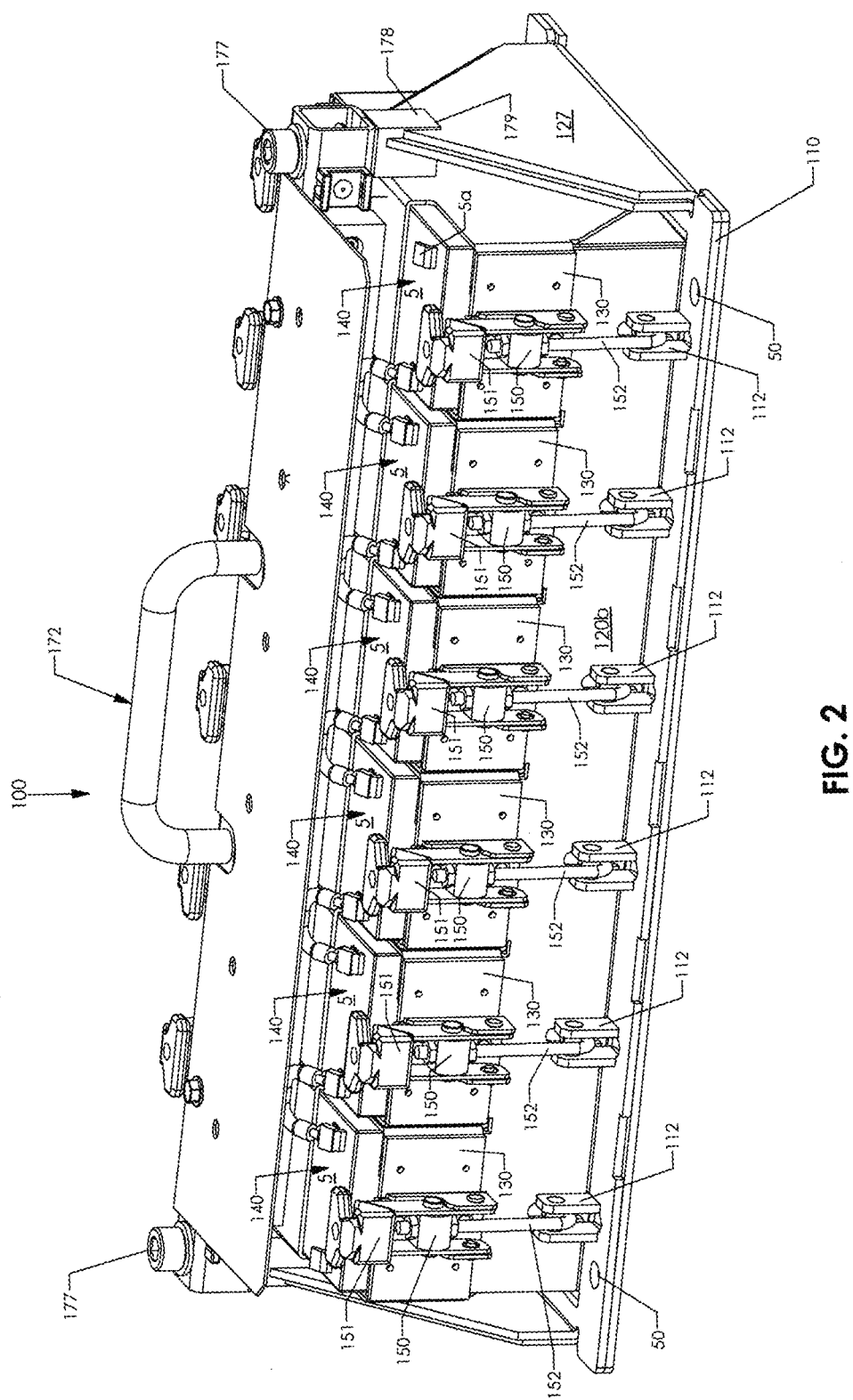
FIG. 2 shows an isometric view of a working embodiment of a retainer apparatus.

As but one example of an innovative retention system, FIG. 2 shows a retention apparatus 100 configured to reliably retain a plurality of battery elements 5 being operatively coupleable with each other. When operatively coupled with each other, the plurality of battery elements 5 can form an array of battery elements comprising a pitch-control battery.

Figure 1:
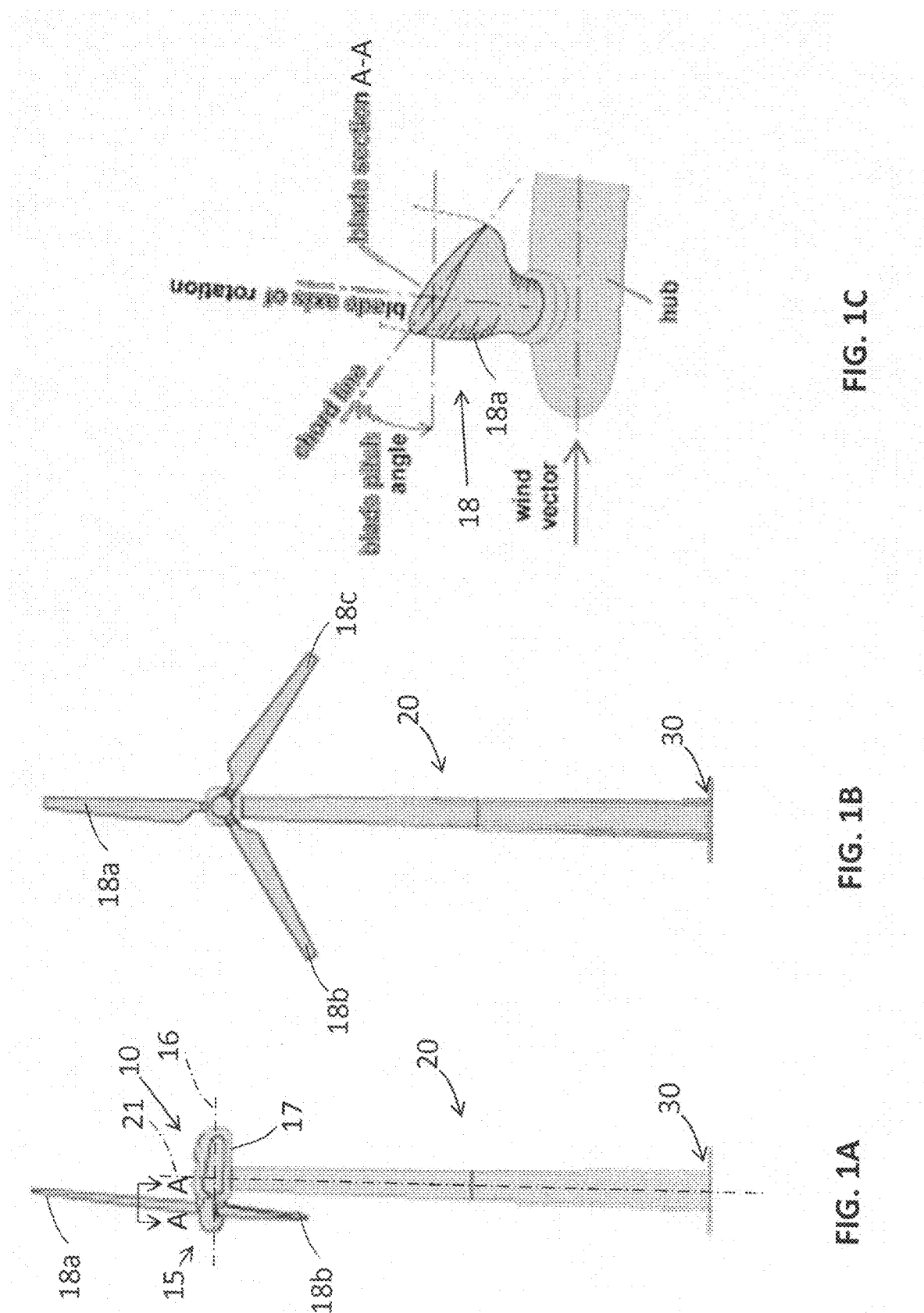
FIG. 1A shows a side elevation view of a horizontal axis wind turbine mounted atop of tower.
FIG. 1B shows a front elevation view of the wind turbine shown in FIG. 1A.
FIG. 1C shows an isometric view of a portion of the wind turbine shown in FIG. 1A and a cross-section of a rotor blade taken along section line A-A.

A retention apparatus of the type shown in FIG. 2 is sometimes referred to in the art as a "battery box". In some embodiments, such a retention apparatus can be one of several components included in an adjustable pitch rotor 18 (FIGS. 1A, 1B, 1C). For example, the adjustable pitch rotor 18 can have an airfoil 18a and a structural member (not shown) positioned within the airfoil and extending generally longitudinally of the blade axis of rotation. As described below, the retention apparatus 100 can be configured to reliably retain the plurality of battery elements 5 in a rotating frame of reference when exposed to random mechanical vibrations and many cycles of temperature variation ranging from extremely high temperatures to extremely low temperatures.

The retention apparatus 100 is configured to releasably retain each battery element in the plurality of battery elements 5 independently of the other battery elements, allowing a technician to replace one or more of the battery elements independently of the others. The retention apparatus 100 can have a base 110 configured for mounting to a structural member in an adjustable-pitch rotor 15 and one or more retention chambers defining one or more open interior regions, respectively, being capable of receiving one or more of the battery elements.

In FIG. 2, the retention apparatus has six retention chambers, each being occupied by a single battery element 5. Each retention chamber is defined by a plurality of walls defining an open interior region forming the respective chamber. One or more walls of the retention chamber can be movable relative to the base 110 from an open configuration (e.g., FIG. 3) to a closed configuration (e.g., FIG. 2).

In FIG. 3, opposed first and second walls 120a, 120b extend from the base 110 and a sleeve 130 configured to matingly engage the opposed first and second walls is shown spaced from the base. A retention chamber 140 defined when the sleeve 130 matingly engages the walls 120a, 120b extending from the base 110. As shown in FIG. 2, a fastener can be configured to releasably retain the sleeve 130 in a mating engagement with one or both of the opposed first and second walls 120a, 120b, such that the battery element 5 can be received within the retention chamber 140 partially defined by an open region 142 in the sleeve 130.

When the retention chamber 140 is in an open position, as shown for example in FIG. 3, the interior region of the retention chamber can be accessed by a technician, allowing the technician to remove a corresponding (e.g., inoperable) battery element 5 from the interior region and to insert a (e.g., operable) battery element into the interior region.

Some retention chambers have an open interior region shaped corresponding to a shape of one or more respective retainable elements. In the closed configuration, one or more inwardly-facing surfaces of the retention chamber can urge against respective surfaces of the one or more respective elements, applying a retaining force to the one or more respective elements and reducing or eliminating relative movement between (or among) the one or more elements and the surfaces of the retention chamber, even as the retention chamber and the respective one or more elements are subjected to an acceleration.

When positioned in the closed configuration, some retention systems as disclosed herein can retain one or more elements (e.g., battery elements) in an array of elements, despite potentially large accelerations (e.g., ranging less than the acceleration due to gravity, to well in excess of the acceleration due to gravity, such as, for example, between about 3 m/s$^2$ and about 20 m/s$^2$) of the array of elements and/or fluctuations between temperature extremes (e.g., between about −40° C. and about 300° C.) of an environment in which the array of elements is operatively installed. In some examples of disclosed retention systems, each retention chamber is configured to retain one corresponding battery element. In other embodiments, one or more retention chambers is configured to retain a plurality of, for example, battery elements.

In the case of retaining an array of battery elements 5, the plurality of elements can be operatively coupled to one or more electrical circuits in a known fashion. In a working embodiment of a disclosed retention system, an example of such a battery element is a Model No. NPX-35FR battery available commercially from ENERSYS.

Working Embodiment of Disclosed Retention Systems

As shown in FIG. 2, a working embodiment of a retention system can have a plurality of juxtaposed retention chambers 140 configured to receive a corresponding plurality of juxtaposed battery elements. The illustrated retention apparatus 100 has six juxtaposed retention chambers 140, although it is possible to have more or fewer retention chambers in other embodiments. Each retention chamber 140 can be configured to receive, for example, one battery element 5, such that the retention system as a whole is configured to retain the plurality of juxtaposed battery elements 5.

Retention apparatus of the type illustrated in FIG. 2 have a housing member 160 (FIGS. 4A, 4B, 4C and 4D) and a sleeve member 130 (FIGS. 5A, 5B, 5C and 5D) corresponding to each of the plurality of retention chambers 140. Each sleeve member 130 is matingly engageable with the housing member 160 so as to define a respective retention chamber 140. As shown in FIG. 2, a battery element 5 can be positioned between the sleeve member 130 and the housing member 160, such that when the sleeve member matingly engages the housing member, the battery element occupies and is reliably retained within an interior region defined by the mated housing member and sleeve member. An open interior region defined by an assembly of a sleeve member 130 mated with a housing member 160 is sometimes referred to as a "retention chamber."

The housing member 160 has a base 110. The illustrated base 110 is generally planar and defines a centerline axis 111 extending longitudinally of the base. The base 110 defines a plurality of apertures 50 arranged in a pattern corresponding to, e.g., a pattern of mounting lugs or a pattern of threaded mounting apertures defined by a structural member (e.g., of a rotor 18) to which the base 110 is mountable. Also, the base 110 has a fastener-engagement feature 112 configured to engage a fastener 150 extending between the housing member 160 and the sleeve member 130.

The housing member 160 has a first generally planar wall 120a extending generally perpendicularly from the base 110 and oriented generally parallel to the centerline axis 111. The housing member 160 also has a second generally planar wall 120b extending generally perpendicularly from the base 110 and oriented generally parallel to the centerline axis 111. The first generally planar wall 120a is spaced from the centerline axis 111 in a first direction and the second generally planar wall 120b is spaced from the centerline axis in a second direction generally opposite the first direction, such that the first wall and the second wall face each other in an opposed relationship, as shown, for example, in FIG. 4A.

In some instances, the first wall 120*a* and the second wall 120*b* are each fixedly attached to the base 110 (as by welding, brazing or other metal-to-metal joining technique). In other instances, the base 110 and one or both of the first wall 120*a* and the second wall 120*b* form a unitary construction (as by casting, injection metal molding or other metal forming process).

Each of the first wall 120*a* and the second wall 120*b* can define a plurality recessed regions 122 extending proximally from a distal edge 124 of the respective wall 120*a*, 120*b* toward the base 110. As shown in FIG. 4C, the recessed regions 122 can define a plurality of juxtaposed notches and a respective plurality of juxtaposed wall portions 125 extending between and outwardly of the juxtaposed notches. In the illustrated working embodiment of the housing 160, each of the plurality of notches 122 in the first wall 120*a* corresponds to one of the plurality of notches in the second wall 120*b* such that each notch in the first wall is positioned opposite a corresponding notch in the second wall.

Figure 5A:
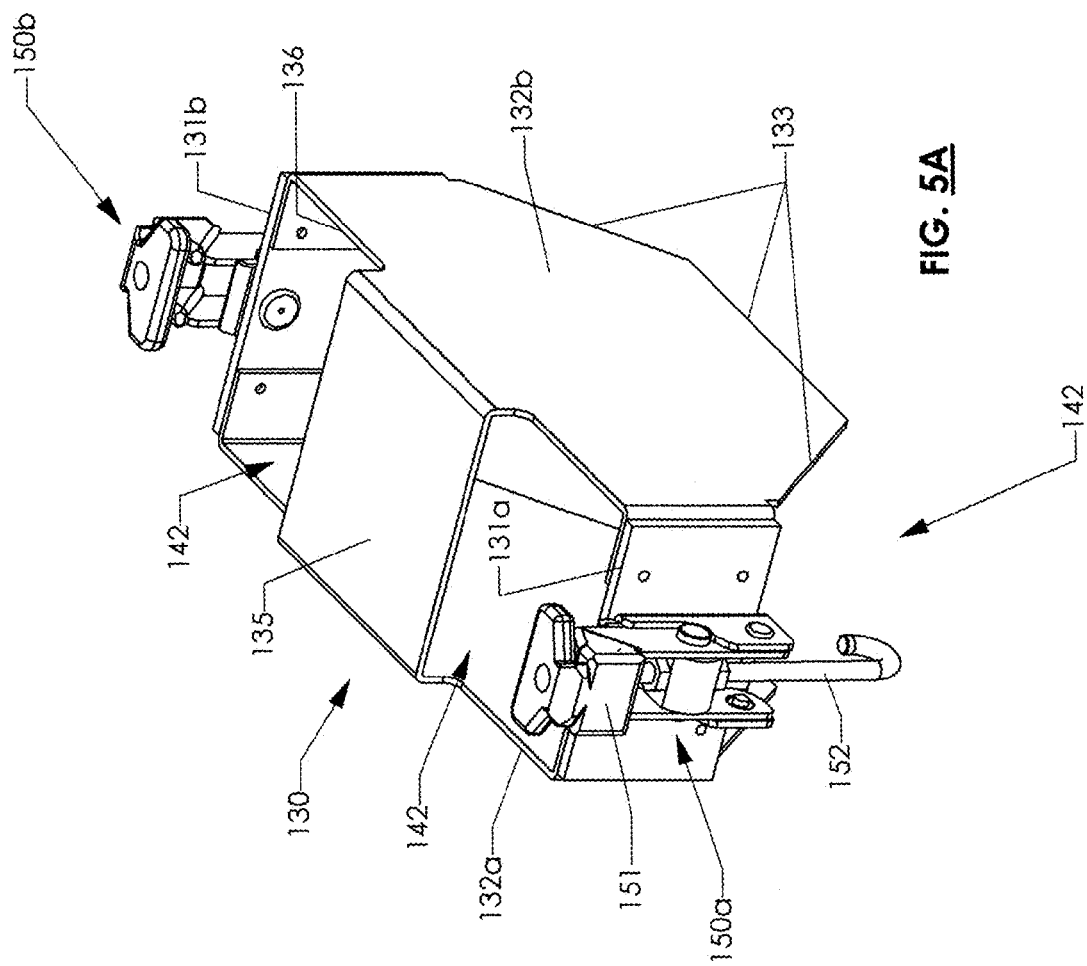
FIG. 5A shows an isometric view from above a sleeve member of the apparatus shown in FIG. 2.
Figure 5B:
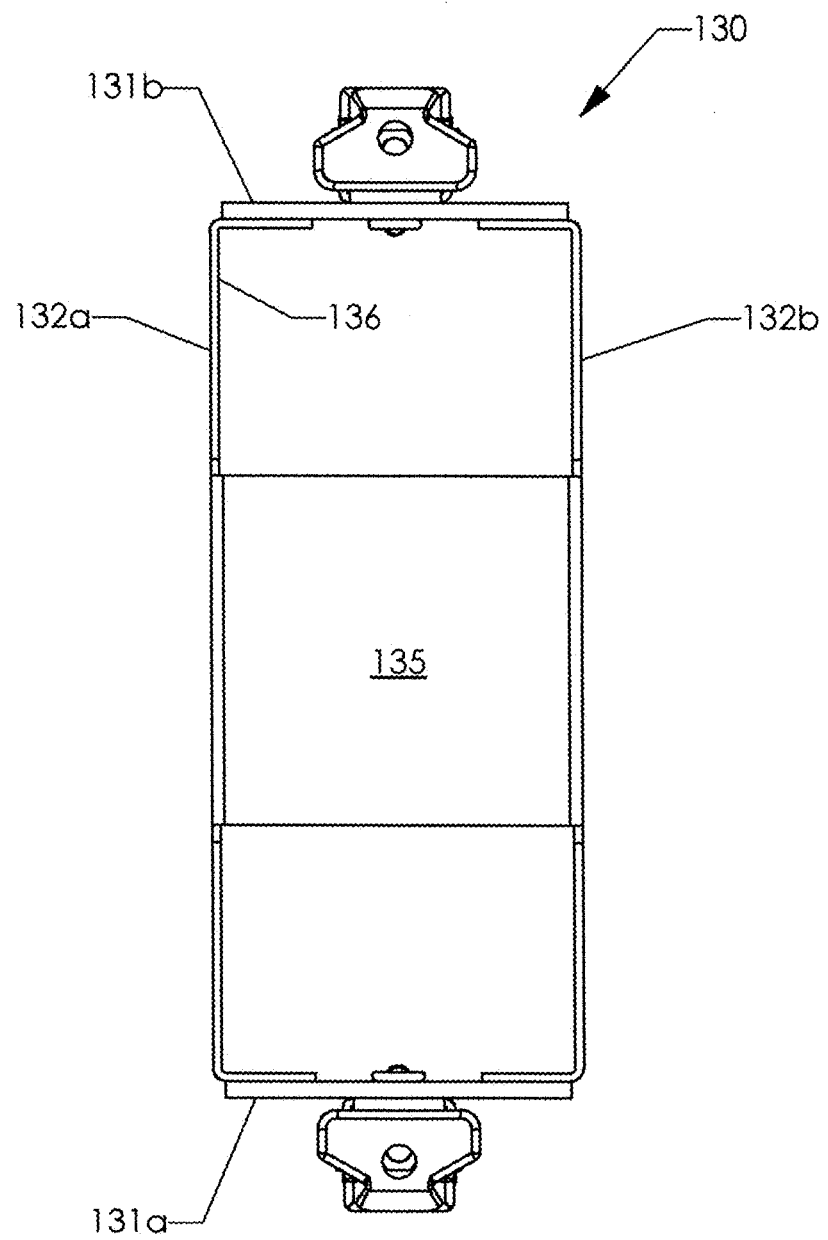
FIG. 5B shows a top-plan view of the sleeve member shown in FIG. 5A.
Figure 5C:
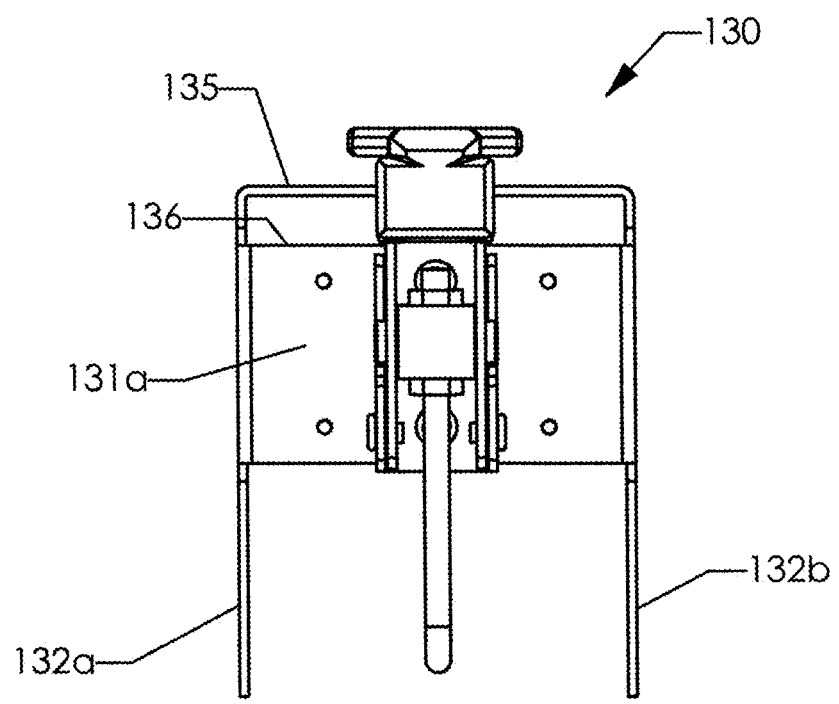
FIG. 5C shows an end-elevation view of the sleeve member shown in FIG. 5A.

As FIG. 5A shows, a sleeve member 130 can have a first end wall 131*a* and a second end wall 131*b* in opposed relationship relative to each other. A first sidewall 132*a* and a second sidewall 132*b* can be positioned in an opposed relationship relative to each other, and can extend between the first end wall 131*a* and the opposed second end wall 131*b*.

At least one of the opposed side walls 132*a*, 132*b* can have a tapered longitudinal dimension, l, such that the at least one of the opposed side walls defines a spade-like periphery 133. The tapered periphery 133 shown in FIGS. 5A and 5D is generally symmetric about an axis 134 extending transverse relative to a longitudinal dimension, l, of the side wall 132*b*. Such a symmetrically shaped periphery 133 can assist a user in aligning the sleeve member 130 relative to the walls 120*a*, 120*b* (FIG. 4A) when assembling the sleeve member and housing member 160 in a mating engagement. For example, a misaligned sleeve member 130 can have one edge of the tapered periphery 133 in contact with a corresponding wall (e.g., 120*a*) while an opposite edge of the tapered periphery 133 is spaced from the corresponding wall (e.g., 120*b*), which tends to urge the sleeve member in a direction tending to close the gap between the spaced apart edge and wall.

A top wall 135 can be oriented generally transversely relative to the end walls 131*a*, 131*b* and the sidewalls 132*a*, 132*b*. The top wall 135 can extend between and adjoin the sidewalls 132*a*, 132*b*. The illustrated top wall 135 extends partially between but is spaced from the opposed end walls 131*a*, 131*b*. This configuration provides an aperture 136 sized to permit an electrical conductor to extend from an operative connector of an electrical circuit to, for example, a battery terminal 5*a* of a battery 5 positioned within the open interior region 142 of the retention chamber 140.

In FIG. 6, a handle member 170 is shown. As used herein, "handle" means a user-graspable portion. The handle member 170 has an elongate member 171 configured for mounting to the retention apparatus 100 and a handle portion 172 extending, for example, longitudinally symmetrically about a mid-portion 173 of the elongate member. The handle portion 172 has opposed upright members 174*a*, 174*b* and a longitudinally extending member 175 spanning a region between the upright members. The elongate member 171 also defines a plurality of mounting features (e.g., apertures 176) configured to engage a corresponding feature of the retention apparatus 100, or, for example, a fastener 177, such as, for example, a bolt, a pin or a lug.

Figure 4A:
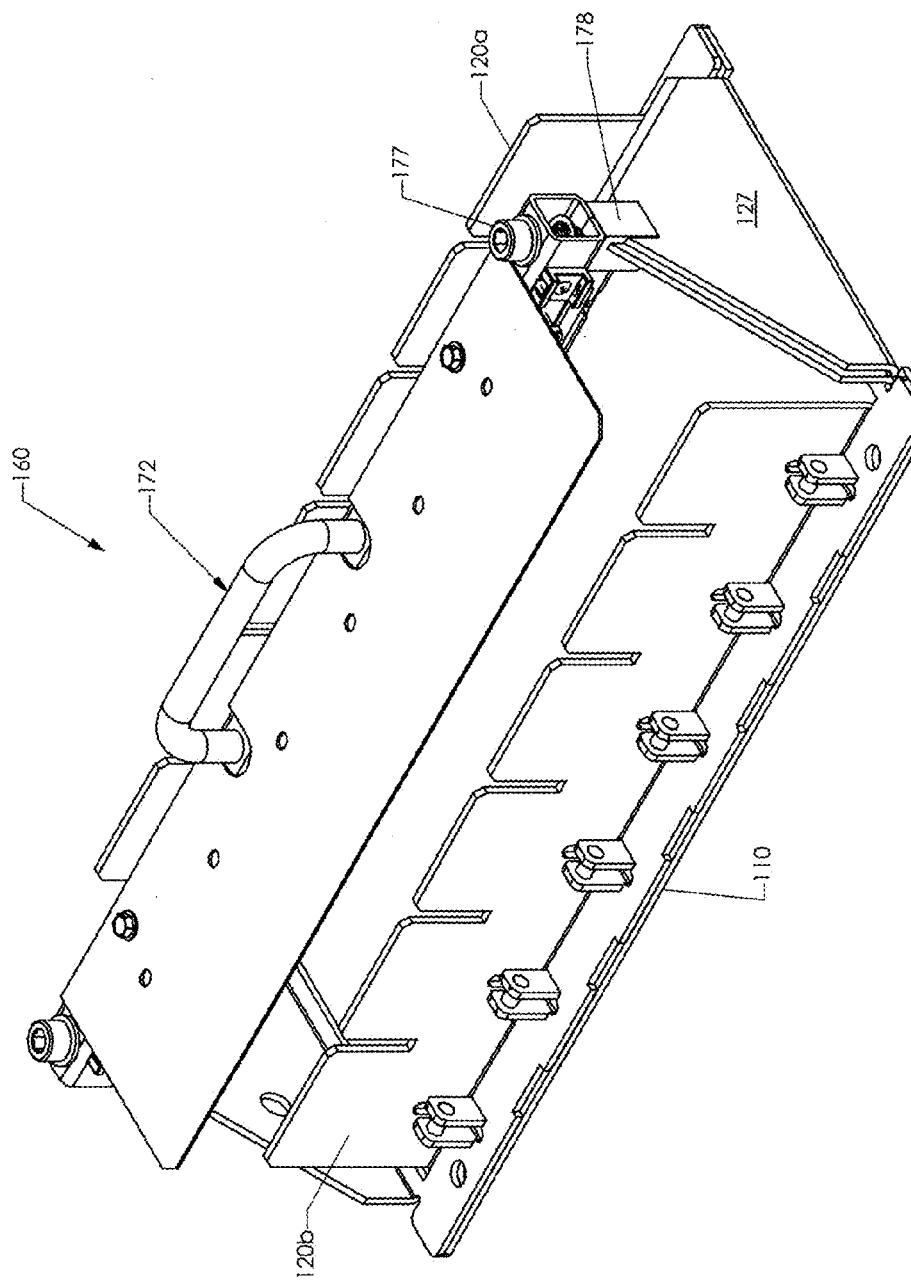
FIG. 4A shows an isometric view from above a housing member of the apparatus shown in FIG. 2.
Figure 4B:
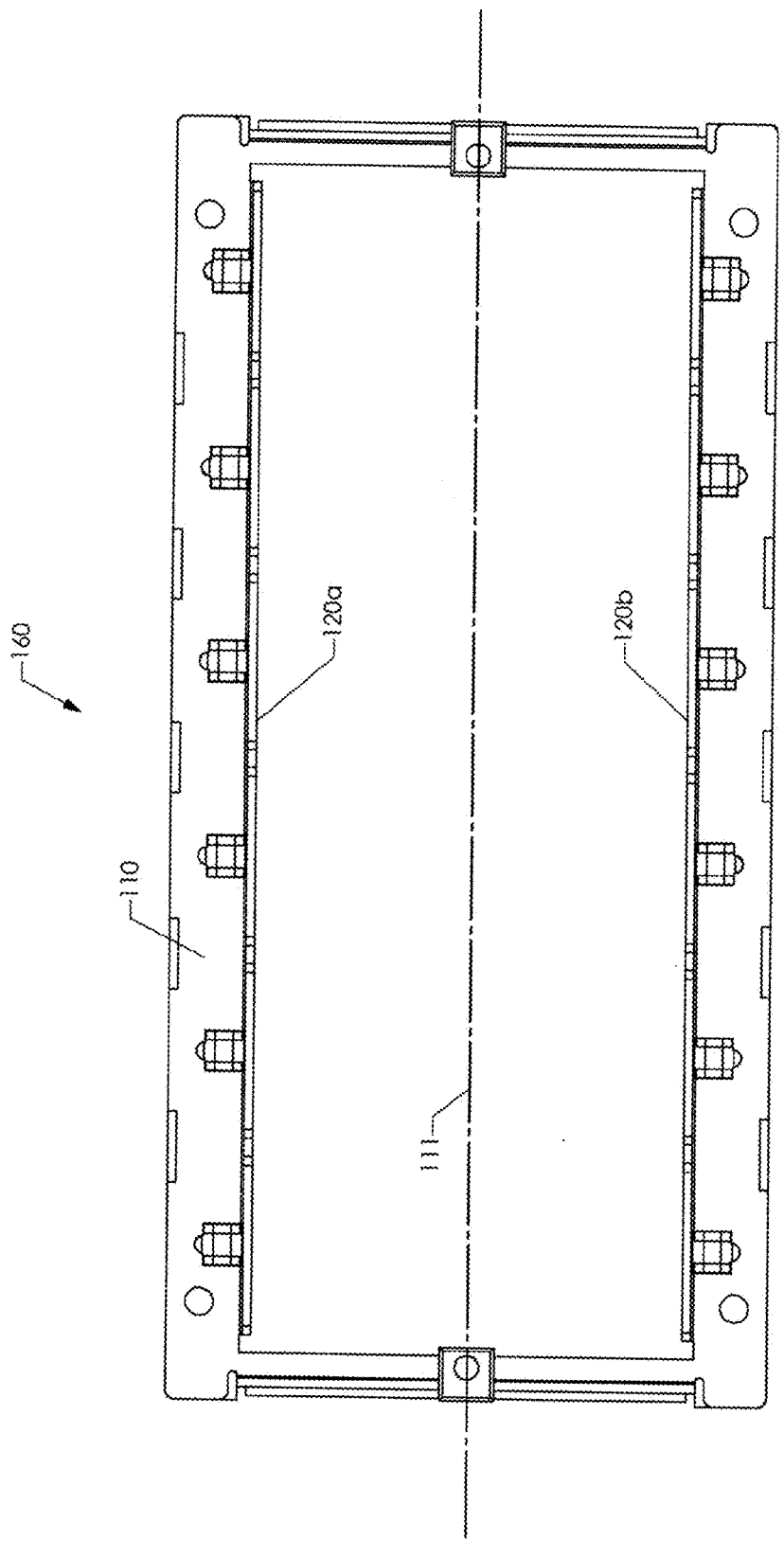
FIG. 4B shows a top-plan view of the housing member shown in FIG. 4A.
Figure 4C:
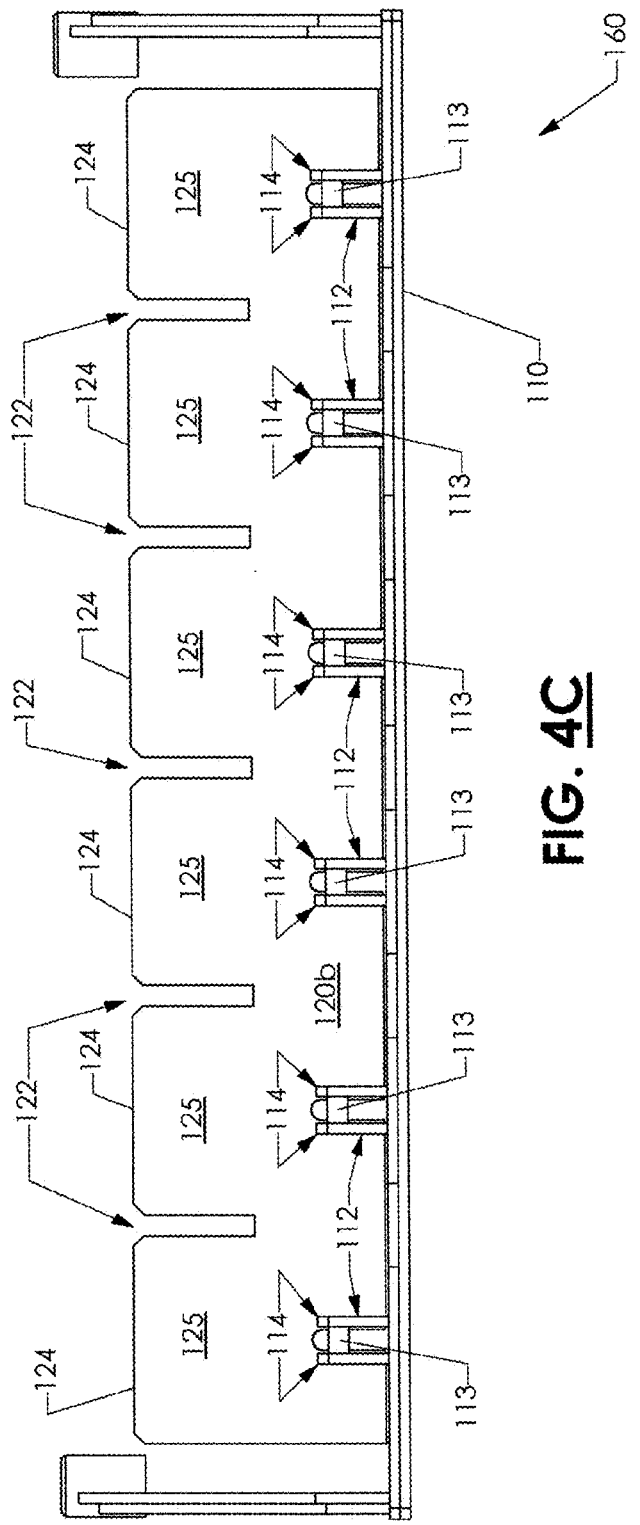
FIG. 4C shows a side elevation view of the housing member shown in FIG. 4A.
Figure 4D:
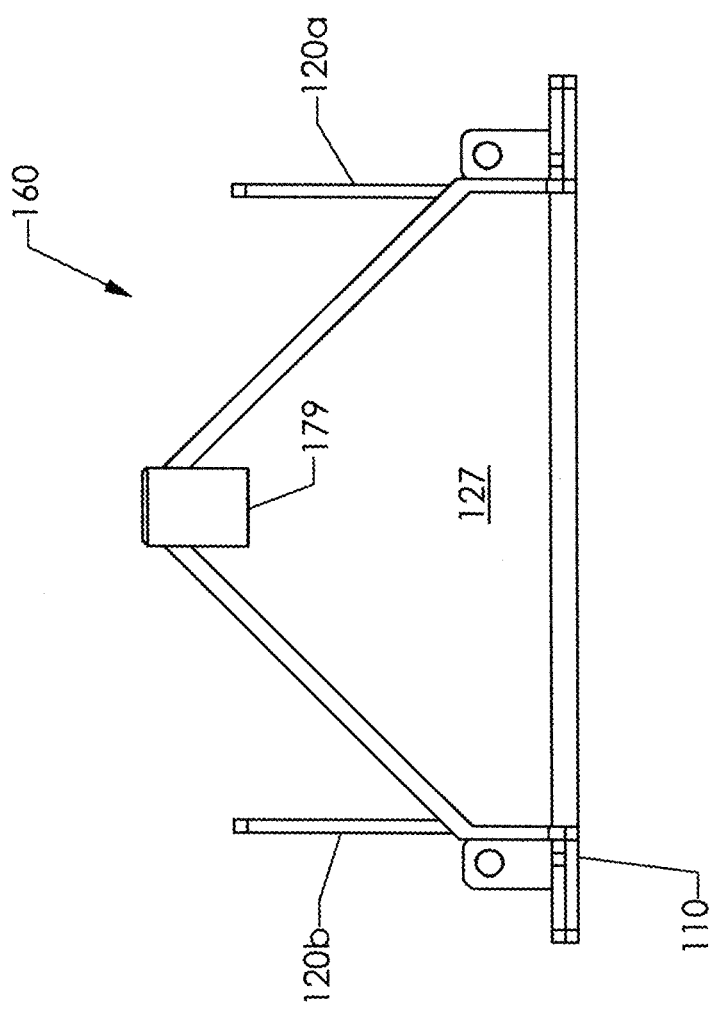
FIG. 4D shows an end-elevation view of the housing member shown in FIG. 4A.

When mounted to the retention apparatus 100, each of the opposed end portions 178 of the elongate member 171 is received in a recessed region 179 of a housing end-plate (FIGS. 2 and 4A). The elongate member 171 can urge against or otherwise redundantly (e.g., in addition to the fasteners described below) retain the plurality of sleeve members 130 in the closed configuration shown in FIG. 2.

In other examples, a cover (not shown) can be positioned over the retainable battery element and operatively coupled to the battery element. For example, such a cover can define an electrical coupler being accessible from outside the retention chamber, while at the same time enclosing the element, as to protect it from the elements. In some instances, such a cover can provide a water-tight seal.

In the retention apparatus 100 shown in FIG. 2, each of the recessed notches 122 in the opposed first and second walls 120*a*, 120*b* of the housing member 160 are sufficiently sized to slidingly receive a side wall 132*a*, 132*b* of a sleeve 130. Additionally, the juxtaposed notches 122 are sufficiently spaced apart from each other to allow opposed sidewalls 132*a*, 132*b* of a given sleeve 130 to be slidingly received into adjacent notches 122. As well, the opposed end walls 131*a*, 131*b* of the sleeve 130 (FIG. 5A) are sufficiently spaced apart from each other as to lie outwardly of the opposed portions 125 of the first and second walls 120*a*, 120*b* of the housing 160 (FIG. 4A) when the sleeve member 130 slidingly mates with the housing member 160. Additionally, each notch 122 is sized to simultaneously receive one respective sidewall 132*a*, 132*b* of each of two adjacent sleeve members 130.

The housing member 160 and the sleeve member 130 can be sized to correspond to a battery element 5 to be retained in the retention chamber 140. For example, when the battery element is positioned in the retention chamber and retained in the closed position, shown in FIG. 2, (A) the opposed wall portions 125 (FIG. 4A) can urge against respective faces of the battery element 5; (B) the respective opposed side walls 131*a*, 131*b* of the corresponding sleeve 130 (FIG. 5A) can urge against respective faces of the battery element 5; and (C) the opposed top wall 135 and the base 110 can urge against respective faces of the battery element.

As noted above, a fastener 150 can be placed in tension and extend between the housing member 160 and a sleeve member 130, engaging a portion of the housing member and a portion of the sleeve member so as to urge the housing member and the sleeve member together in, for example, the mating engagement shown in FIG. 2. The base 110 of the housing member 160 can have a fastener-engagement feature 112 corresponding to each respective fastener. In the illustrated working embodiment, the fastener-engagement feature 112 is configured as a rod 113 (or dowel) extending between opposed apertures defined by generally parallel and opposing bosses 114.

As shown in FIG. 5A, a first fastener 150*a* and a second fastener 150*b* can be mounted to each sleeve 130. For example, the first fastener 150*a* can be mounted to an outer surface of the first end wall 131*a* of the sleeve 130 and the second fastener 150*b* can be mounted to an outer surface of the second end wall 131*b* of the sleeve. Each fastener 150*a,b* has a clasp member 151 and a J-hook member 152. Each respective clasp member 151 is mounted to a corresponding end wall 131*a,b* of the sleeve member 130 and has a cam-over latch.

As shown in FIG. 2, the J-hook member 152 of a fastener 150 is configured to at least partially circumferentially engage the rod 113. The cam-over latch is configured to place the J-hook member 152 in tension when the cam-over latch is in a closed position. Tension applied to the J-hook member 152 when the cam-over latch is in the closed position urges the rod 113, and thus the bosses 114 and the base 110, toward the sleeve member 130, thereby maintaining the mating engagement between the sleeve member 130 and the housing member 160. When the cam-over latch is in an open position, tension in the J-hook member 152 is released and the J-hook member can be freely disengaged from the rod 113, allowing the sleeve member 130 to be disengaged from the housing member 160, e.g., for accessing a battery element 5 within the interior region of the retention chamber 140.

As well, a "zip-tie" or other apparatus can engage a fasteners and retain the fastener in the fastener closed position. In some instances, the zip-tie engages the cam-over latch of each in an opposed pair of fasteners, extending between the fasteners after the fasteners in the pair have been positioned in the fastener-closed position. The zip-tie can be placed in tension, applying a biasing force to the fasteners to maintain the fastener-closed position and providing another measure of redundancy in the retention of the sleeve members 130.

As noted above, the elongate member 171 (FIG. 2) can redundantly retain the sleeve members 130, as well. Accordingly, some retention systems can provide three modes of redundant retention of a plurality of retainable elements.

Retention systems disclosed herein can be constructed from any suitable material. For example, walls of some working embodiments are constructed from a commercially available alloy of aluminum, although it is possible to construct other embodiments from, for example, an alloy of steel or an alloy of stainless steel. Nonmetallic compounds, and composites, can be used. In some embodiments of retention systems, a polymer compound can be used. In other embodiments, fiber reinforced composite materials, such as, for example, glass fiber in an epoxy matrix can be used. In other embodiments, carbon-fiber composite materials can be used.

Other Embodiments

Using the principles disclosed herein, those of ordinary skill will appreciate a wide variety of possible embodiments of retention systems, particularly those configured to reliably retain one or more elements, such as, for example, a plurality of battery elements. For example, other retention system configurations, e.g., for a pitch-control battery, are possible.

Figure 7:
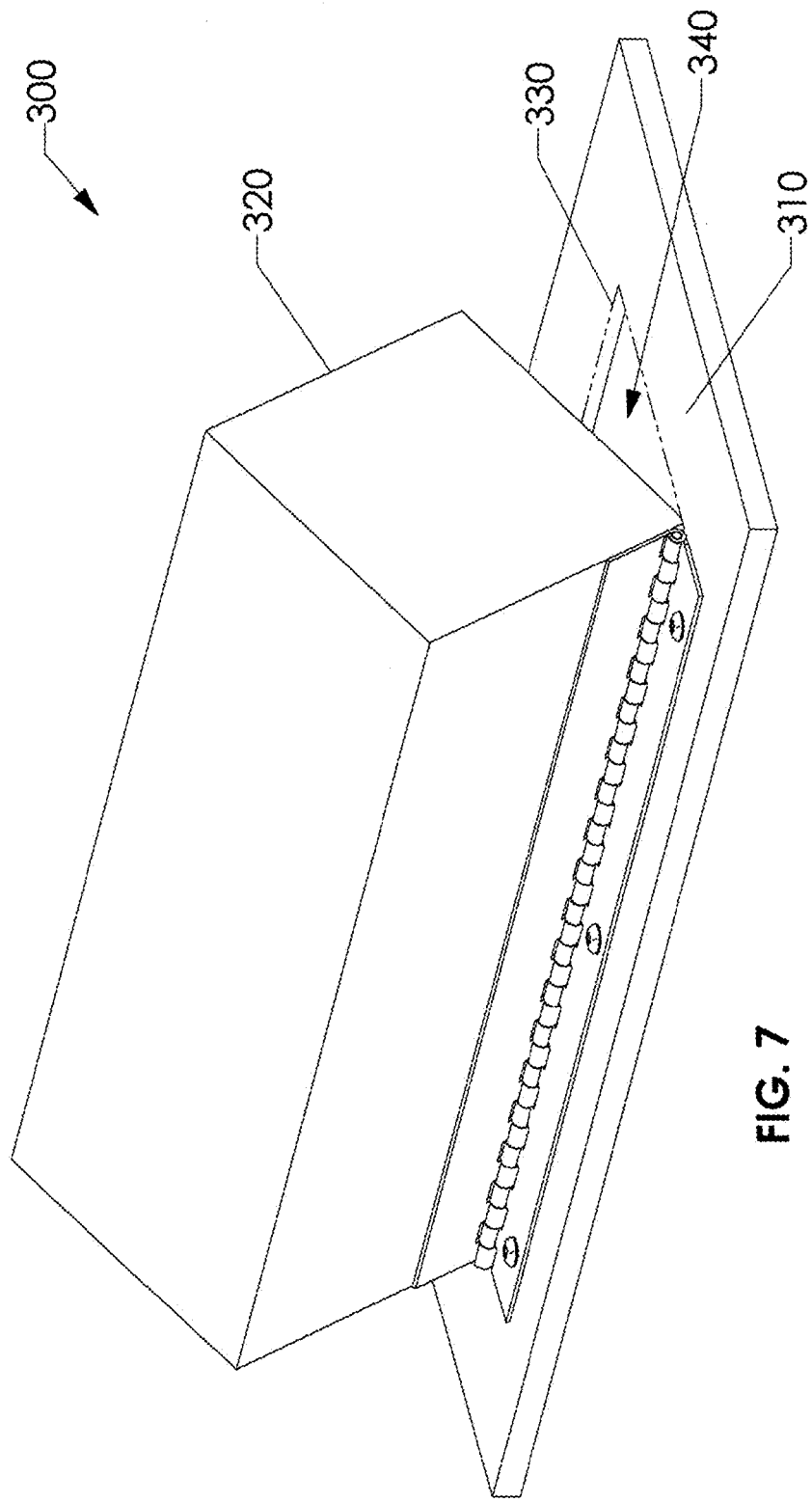
FIG. 7 shows an isometric view of an alternative embodiment of a retainer apparatus.

As but one such example, FIG. 7 shows that a retention apparatus 300 can have a base 310 and a housing member 320 hingedly coupled with the base such that the housing member is configured to swing from a closed, retention position (shown by dashed line 330) overlying the base to an open position. In FIG. 7, the housing member is shown in a partially open position between the closed position and the open position. In the closed, retention position, a base engagement member extending from the housing (e.g., a tenon), not shown can be slidably received in a recess, slot, or aperture (e.g., a mortise) not shown, defined by the base. When the housing is positioned in the open position, a retainable element can be inserted or removed from an open interior region 340 within the housing member.

Such a housing member 320 can define one or more open interior regions configured to receive a retainable element. The base 310 can define one or more fastener engagement features, and one or more corresponding fastener members can be mounted to the housing and configured to engage a respective one or more of the fastener engagement features, e.g., as described above. In other embodiments, the housing member 320 is separable from the base 310.

Figure 8:
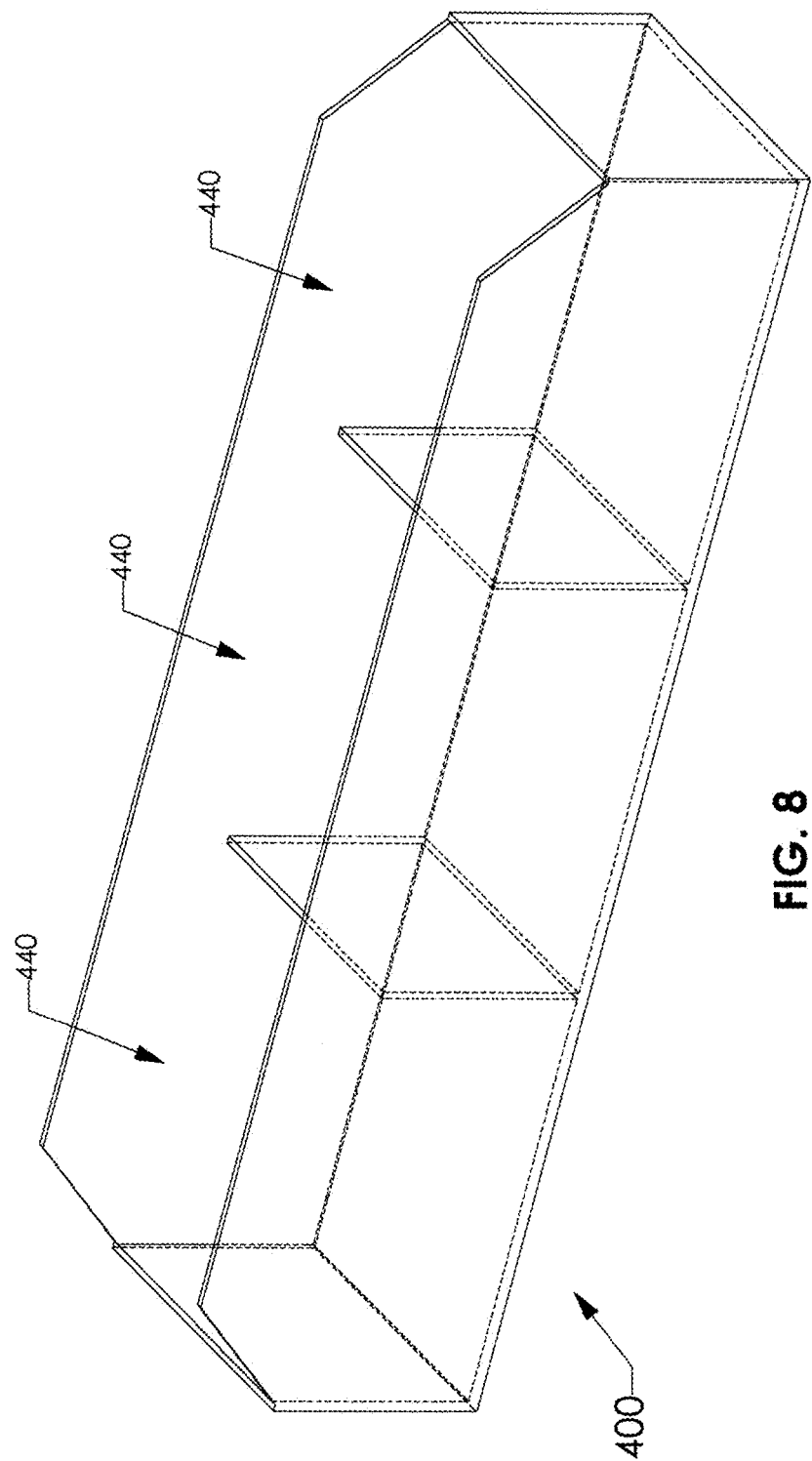
FIG. 8 shows an isometric view of an alternative embodiment of an apparatus defining a plurality of retention chambers.
Figure 9:
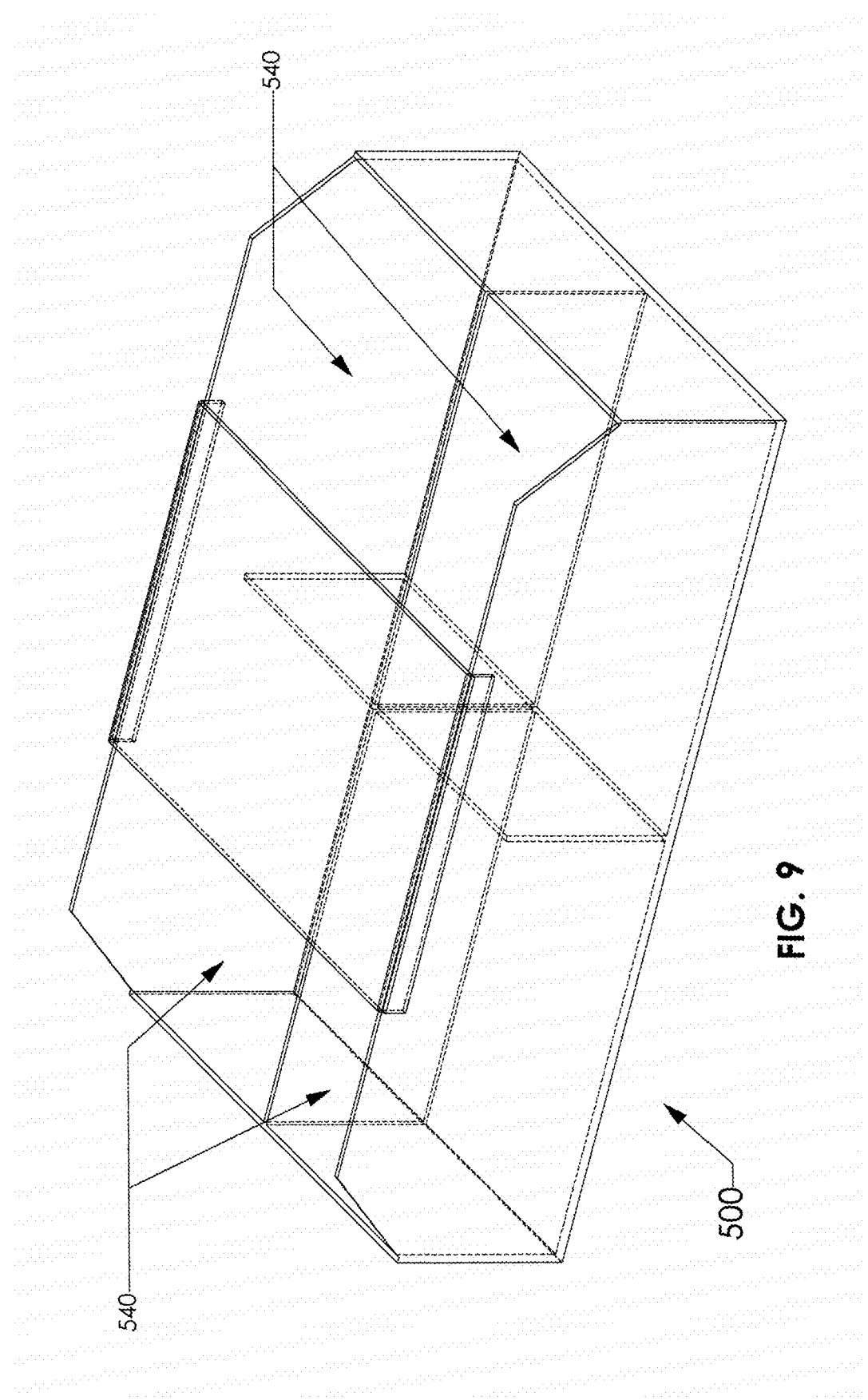
FIG. 9 shows an isometric view of an alternative embodiment of an apparatus defining a plurality of retention chambers.

Also, rather than a plurality of juxtaposed retention chambers 140 aligned with each other in single row, as shown by way of example in FIG. 2, a single housing member 400 can define a plurality of juxtaposed retention chambers 440, as shown in FIG. 8. A plurality of the housing members 400 can be positioned in a juxtaposed relationship, forming a two-dimensional array (not shown) of retention chambers 440. Alternatively, a single housing member 500 can define a plurality of rows and a plurality of columns of retention chambers 540 (e.g., forming a two-dimensional array of retention chambers 540 arranged in rows and columns), as shown in FIG. 9. Two or more such two-dimensional arrays of retention chambers can be stacked along a third dimension to provide a three-dimensional array of retention chamber.

As shown in the plan view of an alternative housing member 660 shown in FIG. 10. the base 610 can define a plurality of juxtaposed slots 622 extending transverse to a longitudinal axis of the base. Each slot in the base 610 can be sized to slidably receive a portion of a sidewall 132a, 132b of a sleeve (FIG. 5A), such as, for example, an apical portion of a tapered sidewall, retaining the generally planar sidewall from bending out of plane.

Disclosed Principles are not Limited to Described Embodiments

This disclosure makes reference to the accompanying drawings which form a part hereof, wherein like numerals designate like parts throughout. The drawings illustrate specific embodiments, but other embodiments may be formed and structural changes may be made without departing from the intended scope of this disclosure. Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" as well as "and" and "or."

Accordingly, this detailed description shall not be construed in a limiting sense, and following a review of this disclosure, those of ordinary skill in the art will appreciate the wide variety of interferometer systems that can be devised and constructed using the various concepts described herein. Moreover, those of ordinary skill in the art will appreciate that the exemplary embodiments disclosed herein can be adapted to various configurations without departing from the disclosed concepts. Thus, in view of the many possible embodiments to which the disclosed principles can be applied, it should be recognized that the above-described embodiments are only examples and should not be taken as limiting in scope.

Therefore, we claim as our invention all that comes within the scope and spirit of the following claims.

We currently claim:

1. An adjustable-pitch rotor comprising:
   an airfoil;
   a structural member positioned within the airfoil; and
   a retention chamber positioned adjacent to the structural member and configured to releasably retain one or more of a plurality of battery elements comprising a pitch-control battery, such that a technician can replace one or more of the plurality of battery elements independently of one or more other of the plurality of battery elements.

2. The adjustable-pitch rotor of claim 1, wherein the retention chamber is at least partially defined by a base mounted to the structural member, opposed first and second walls extending from the base and a sleeve configured to matingly engage the opposed first and second walls, the adjustable pitch rotor further comprising a fastener configured to releasably retain the sleeve in a mating engagement with one or both of the opposed first and second walls.

3. The adjustable-pitch rotor of claim 1, wherein the retention chamber is at least partially defined by a base mounted to the structural member and housing configured to be at least partially releasably affixed to the base and to receive one or more of the plurality of battery elements.

4. The adjustable-pitch rotor of claim 3, wherein the housing is hingedly coupled with the base such that the housing is configured to swing from a closed, retention position overlying the base to an open position, wherein, when the housing is positioned in the open position, one or more of the respective plurality of battery elements can be accessed.

5. A battery retainer comprising:
a generally planar base defining a centerline axis extending longitudinally of the base and having a fastener-engagement feature;
a first generally planar wall extending generally perpendicularly from the base and oriented generally parallel to the centerline axis, wherein the first generally planar wall defines a first plurality of juxtaposed notches;
a second generally planar wall extending generally perpendicularly from the base and oriented generally parallel to the centerline axis, wherein the second generally planar wall defines a second plurality of juxtaposed notches;
wherein the first generally planar wall is spaced from the centerline axis in a first direction and a second generally planar wall is spaced from the centerline axis in a second direction generally opposite the first direction, and wherein the second plurality of notches corresponds to the first plurality of notches such that each notch in the second plurality of notches is positioned opposite a corresponding one of the notches in the first plurality of notches;
a sleeve having opposed end walls and opposed side walls extending between the opposed end walls and a top wall extending between the opposed side walls and being oriented generally perpendicularly relative to the opposed side walls and the opposed end walls, wherein the end walls, side walls and top wall at least partially define an open interior region, wherein at least one of the opposed side walls has a tapered longitudinal dimension such that the at least one of the opposed side walls defines a spade-like periphery;
wherein a spacing between the opposed side walls at least partially corresponds to a spacing between two of the juxtaposed notches and a spacing between the opposed end walls at least partially corresponds to a spacing between the first generally planar wall and the second generally planar wall such that the sleeve is configured to matingly engage the first generally planar wall and the second generally planar wall with the opposed side walls slidingly receiving in respective notches and the opposed end walls are positioned outwardly of the first generally planar wall and the second generally planar wall relative to the open interior region; and
a fastener having a clasp member mounted to a corresponding one of the end walls and a hasp member configured to engage the fastener-engaged member, wherein the clasp member is configured to urge the hasp member toward a first position when the clasp member is in a closed position and to urge the hasp member toward a second position spaced from the first position when the clasp member is in an open position, wherein, when the hasp member engages the fastener engagement member and the clasp member is in the closed position, the hasp member is placed in tension and thereby urges the sleeve toward the base.

6. The battery retainer of claim 5, wherein the sleeve comprises a first sleeve, the retainer further comprising a second sleeve having opposed end walls and opposed side walls extending between the opposed end walls and a top wall extending between the opposed side walls and being oriented generally perpendicularly relative to the opposed side walls and the opposed end walls, wherein the end walls, side walls and top wall at least partially define an open interior region;
wherein a spacing between the opposed side walls of the second sleeve at least partially corresponds to a spacing between two of the juxtaposed notches and a spacing between the opposed end walls of the second sleeve at least partially corresponds to a spacing between the first generally planar wall and the second generally planar wall such that the second sleeve is configured to matingly engage the first generally planar wall and the second generally planar wall.

7. The battery retainer of claim 6, wherein at least one of the notches in the first generally planar wall and the corresponding notch in the second generally planar wall are sized to be able to simultaneously, slidingly receive one of the opposed side walls of the first sleeve and one of the opposed side walls of the second sleeve.

\* \* \* \* \*